United States Patent
Rodenburg

(10) Patent No.: US 8,944,471 B2
(45) Date of Patent: Feb. 3, 2015

(54) ELECTRICALLY CONDUCTIVE HYDRAULIC HOSE

(76) Inventor: Gary Rodenburg, Cedar Springs, MI (US)

(*) Notice: Subject to any disclaimer, the term of this patent is extended or adjusted under 35 U.S.C. 154(b) by 1108 days.

(21) Appl. No.: 12/769,797

(22) Filed: Apr. 29, 2010

(65) Prior Publication Data

US 2010/0308575 A1 Dec. 9, 2010

Related U.S. Application Data

(60) Provisional application No. 61/184,139, filed on Jun. 4, 2009.

(51) Int. Cl.
  F16L 31/00 (2006.01)
  F16L 33/01 (2006.01)
  F16L 11/127 (2006.01)

(52) U.S. Cl.
  CPC ............ F16L 33/01 (2013.01); F16L 11/127 (2013.01)
  USPC .................................................. 285/222.1

(58) Field of Classification Search
  USPC ......... 285/222.1, 222.2, 222.3, 222.4, 222.5
  See application file for complete search history.

(56) References Cited

U.S. PATENT DOCUMENTS

| | | |
|---|---|---|
| 511,188 A | 12/1893 | Barnard |
| 1,223,864 A | 4/1917 | French |
| 2,120,275 A * | 6/1938 | Cowles ................ 285/222.4 |
| 2,430,921 A | 11/1947 | Edelmann |
| 2,610,869 A * | 9/1952 | Allison ................ 285/222.5 |
| 2,883,513 A | 4/1959 | Schnabel |
| 2,140,884 A | 7/1964 | Brauck |
| 3,217,282 A * | 11/1965 | Chevalier et al. ........ 439/452 |
| 3,343,723 A | 9/1967 | Richards |
| 3,549,180 A | 12/1970 | MacWilliam |
| 3,749,814 A | 7/1973 | Pratt |
| 3,963,856 A | 6/1976 | Carlson et al. |
| 4,009,733 A | 3/1977 | Schnabel |
| 4,012,670 A | 3/1977 | Shaw |
| 4,286,911 A | 9/1981 | Benjamin |
| 4,901,975 A | 2/1990 | Gill et al. |
| 5,022,864 A | 6/1991 | Ali |
| 5,050,802 A | 9/1991 | Gill et al. |
| 5,222,770 A | 6/1993 | Helevirta |
| 5,230,405 A | 7/1993 | Bartelt |
| 6,408,986 B1 | 6/2002 | Ayano et al. |
| 7,018,221 B2 | 3/2006 | Daume |
| 7,225,899 B2 | 6/2007 | Molnar et al. |
| 7,458,617 B2 * | 12/2008 | Leslie et al. ............ 285/390 |

FOREIGN PATENT DOCUMENTS

| | | |
|---|---|---|
| DE | 1750392 | 11/1970 |
| JP | 2001287900 | 10/2001 |
| JP | 2004210532 | 7/2004 |

* cited by examiner

*Primary Examiner* — Daniel P Stodola
*Assistant Examiner* — Gwendolyn Driggers
(74) *Attorney, Agent, or Firm* — Price Heneveld LLP

(57) ABSTRACT

An electrically conductive hose apparatus includes a hose having a wire reinforcer therein that is electrically conductive, an end section with some hose material being cut away to expose ends of the wire reinforcer; a hose end stem engaging the hose but not the wire reinforcer; a conductive ferrule sleeve clamped onto the exposed ends of the wire reinforcer; an insulated wire in electrical contact with the exposed ends of the wire reinforcer and the sleeve to form an electrically conductive circuit; and a rotatable coupling nut for rotatably connecting the hose and stem to a high pressure hydraulic system but that is insulated from the electrically conductive circuit. The apparatus can be used in an existing pre-approved high pressure hydraulic hose.

2 Claims, 5 Drawing Sheets

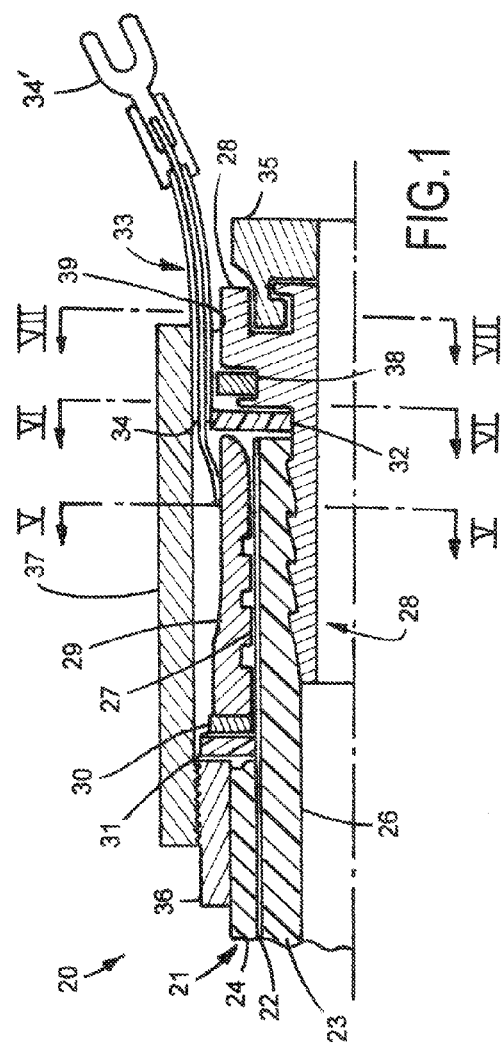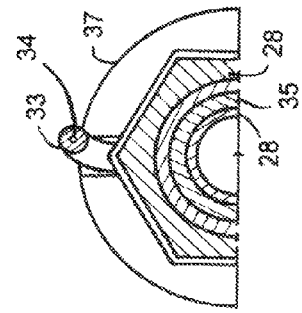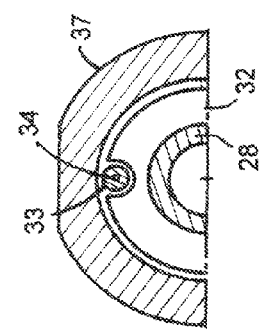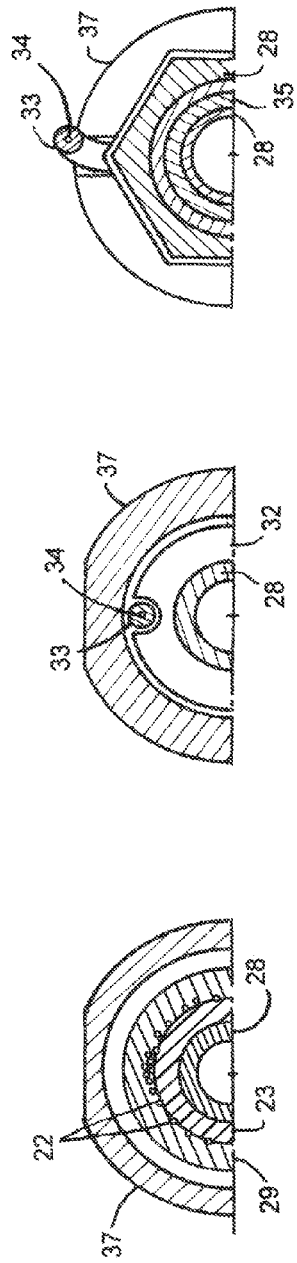

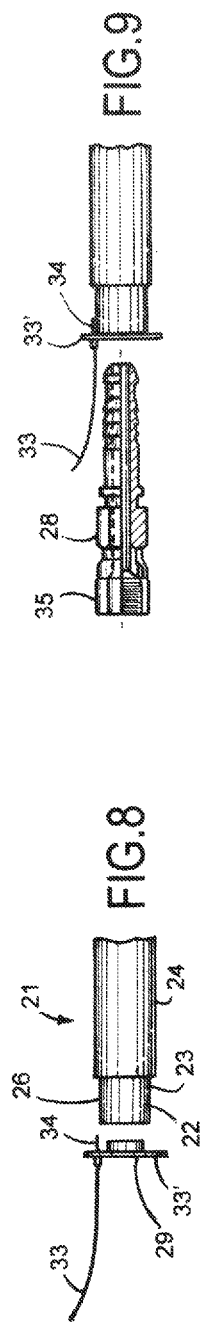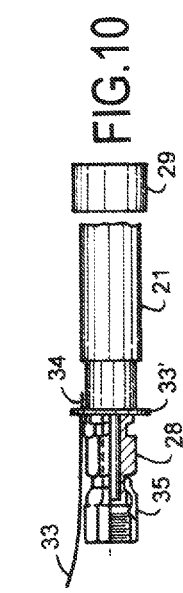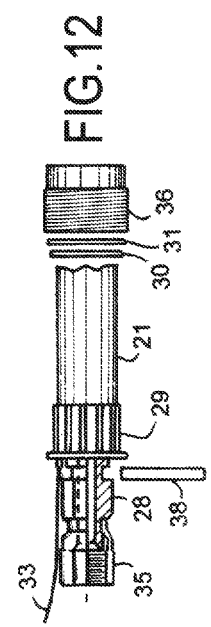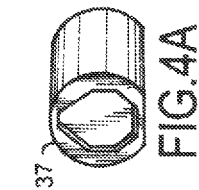

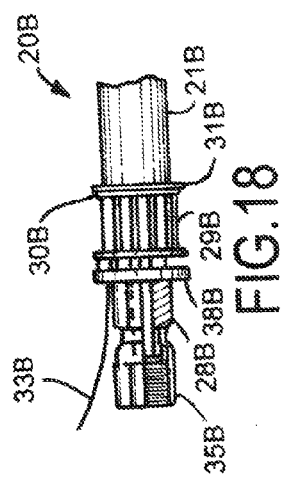
FIG. 18
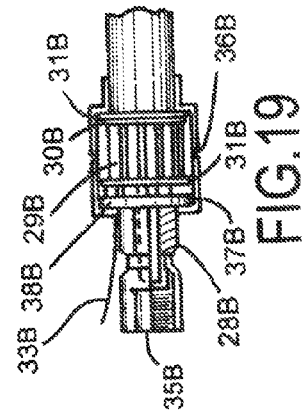
FIG. 19
FIG. 19A
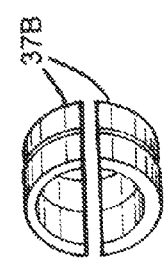
FIG. 19B

ELECTRICALLY CONDUCTIVE HYDRAULIC HOSE

This application claims benefit under 35 U.S.C. §119(e) of provisional application Ser. No. 61/184,139, filed Jun. 4, 2009, entitled ELECTRICALLY CONDUCTIVE HYDRAULIC HOSE, the entire contents of which are incorporated herein by reference.

BACKGROUND

The present invention relates to an electrically conductive hydraulic hose, and more particularly relates to a hose assembly including a conductive end coupling apparatus that can be used on existing wire-reinforced hydraulic hoses (such as commercially-made common pressure hoses like SAE100R17 hose) adapted for high pressure hydraulic systems where the hoses undergo continuous flexing and movement over pulleys and sheaves, such as occurs on fork trucks (also called fork lifts) and other lift vehicles. However, the present coupling apparatus and electrically conductive hose is not limited to only fork trucks and lift vehicles, nor is it limited to only hydraulic hoses that undergo continuous flexing and movement during use.

Modern fork trucks can be equipped with optional accessory equipment to do numerous specialized tasks, using a variety of different attachments and components adapted to perform innumerable different functions and tasks. However, fork trucks are expensive such that customers typically purchase a minimum of them. Also, the accessory equipment is expensive since it must be made permanent, durable and long-lasting. As a result, companies purchase a minimum number of options on each fork truck purchased. A problem results because customers are not able to easily "swap" attachments from one fork lift to another fork lift. This problem occurs because, when a particular fork lift is unavailable (such as when it is out for repair or maintenance), the accessory equipment on that particular fork lift is also not available.

Another problem is that it is often desirable to add an additional function to an existing fork truck, or to replace a particular specialized fork truck while it is out for maintenance, without the expense of renting a replacement. However, it is not desirable to undergo the expense and/or the potential safety issues associated with adding auxiliary attachments (along with their electrical control lines and hydraulic power lines) to achieve the specialized functions of the "missing" specialized fork truck. Notably, fork trucks undergo considerable abuse and wear during use, and further are subject to extensive safety regulations, since they are involved in transporting heavy objects. Thus, it is preferable that any additional attachment be well-protected, durable, robust, safe, and reliable, as well as cost-effective and easy to install and maintain. It is not an easy task to design and install add-on attachments that meet these requirements.

Some electrically conductive hydraulic hoses have been proposed. However, at least one known system requires a special hydraulic hose construction, and therefore also requires certification by regulating authorities (which is expensive and time-consuming) and further also requires a separate manufacturing line (which is expensive to run, requires expensive machinery, line-times are slow, results in lower volume productions of the hose, related higher costs due to inefficient operation and to additional capital investment, and more frequent start-ups and stops every time those particular parts are made).

SUMMARY OF THE PRESENT INVENTION

In one aspect of the present invention, an electrically conductive hose apparatus includes a hose having a wire embedded reinforcer therein that is electrically conductive, an end section with some hose material being cut away to expose ends of the wire reinforcer; a hose end stem engaging the hose but not the wire reinforcer; a conductive ferrule sleeve clamped onto the exposed ends of the wire reinforcer; an insulated wire in electrical contact with the exposed ends of wire reinforcer and the sleeve to form an electrically conductive circuit; and a rotatable coupling nut for rotatably connecting the hose and stem to a high pressure hydraulic system that is insulated from the electrically conductive circuit.

In another aspect of the present invention, an electrically conductive hose apparatus comprises a hose having a wire reinforcer embedded therein that is electrically conductive and having fluid-conveying passageway-defining hose material inside of the wire reinforcer for communicating leak-free hydraulic fluid along the hose inside of the wire reinforcer and also external hose material; an end section of the passageway-defining hose material being cut away to expose ends of the wire reinforcer; a hose end stem engaging the passageway-defining material and not the wire reinforcer; a conductive ferrule sleeve clamped onto the exposed ends of the wire reinforcer; a metal washer on a hose-side portion of the stem and against a hose-side end of the ferrule sleeve; a first insulating washer adjacent and on a hose-side of the metal washer; a second insulating washer adjacent and on a hose-remote side of the ferrule sleeve; an insulated wire including a conductive wire element in electrical contact with the exposed ends of wire reinforcer, the insulated wire extending in a hose-remote direction from the ferrule sleeve and past the second insulating washer; a rotatable coupling nut rotatably connected to the hose-remote end of the stem for connecting the stem in a leak-free manner to a hard threaded hydraulic connector for leak-free connection to the hydraulic connector; a stem retainer nut on the hose and proximate a hose-side portion of the stem; a ferrule sleeve jacket covering and protecting the ferrule sleeve; a slip-on retainer washer shaped to laterally engage a mating ring-shaped recess on the hose-remote side of the stem; and the coupling nut threadably engaging the hose-side end of the jacket with an inwardly-facing annular ring on a hose-remote end of the jacket engaging the slip-on U-shaped retainer washer; the annular ring having a geometric shape for non-rotatably engaging a mating outer geometric surface of the stem.

In another aspect of the present invention, a method comprises providing an existing pre-approved hose for use in high pressure hydraulic applications; removing an end portion of an outer material on the hose to expose conductive reinforcing wires; connecting an insulated wire to the exposed reinforcing wires; connecting a stem to the hose for communicating pressurized hydraulic fluid to the hose but where the stem is insulated from the exposed reinforcing wires and from a conductor in the insulated wire; and connecting the insulated wire to a circuit, including passing electrical current through the conductor and reinforcing wires while using the hose in a hydraulic application.

An object is to provide an electricity-carrying hose that allows a customer to move a power-using carriage accessory onto another fork truck with minimal effort and downtime, using low-skilled labor.

An object is to provide an electricity-carrying hose that allows a fork truck dealer the flexibility to place accessories onto one of his rental fork trucks, with minimal cost and installation time.

An object is to make electrical power "instantly" available at the carriage of the fork truck when an electrified hose of the present invention is on the fork truck. For example, this electrical power can be used to power accessories often placed on carriages of fork truck lifts, such as bar code readers, cameras for aiming forks, lights, sensors, and actuators for particular movements on the carriage bed.

An advantage of the present inventive concepts is that almost anyone now making hoses can practice the present invention without substantial capital investment and/or special components.

An advantage of the present inventive concepts is that they turn the wire braid of existing pre-certified hose into the conductor. This allows immediate and direct replacement for non-electrical conductive hose when retrofitting, since the pre-certified hose is fully pre-qualified for the respective use and further it fits into existing hose reeving (i.e. pulleys and channels). Further, the present hose is relatively easy to manufacture in the factory or even in the field, and is considerably less expensive than known previous attempts.

These and other aspects, objects, and features of the present invention will be understood and appreciated by those skilled in the art upon studying the following specification, claims, and appended drawings.

BRIEF DESCRIPTION OF DRAWINGS

FIG. 1 is a side cross-sectional view of an electrically-conductive hydraulic hose apparatus embodying the present invention.

FIGS. 5-7 are cross sections taken along lines V-V, VI-VI, VII-VIII in FIG. 1.

FIGS. 8-15 are views showing an assembly progression for the hose apparatus of FIG. 1.

FIGS. 16-17 and 18-19 disclose the last few steps in three hose apparatus that are modified from the hose apparatus of FIG. 1; with FIGS. 17A and 17B being plan and perspective views of components in FIG. 17, and FIGS. 19A and 19B being plan and perspective views of components in FIG. 19.

DETAILED DESCRIPTION OF PREFERRED EMBODIMENTS

Figure 4:
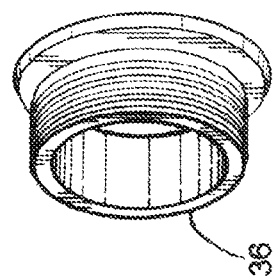
FIGS. 2-4 are side, plan, and perspective views of a hose end stem, retainer washer, and retainer nut, respectively in FIG. 1, FIG. 4A being a perspective view of the ferrule jacket.
Figure 2:
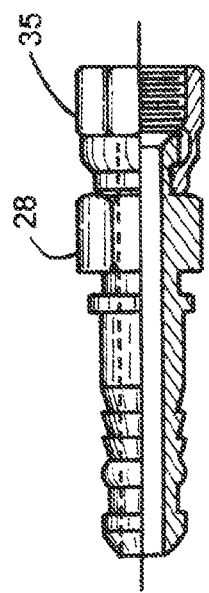

An electrically conductive hose apparatus 20 (FIG. 1) comprises a reinforced hydraulic hose 21 suitable for use in high pressure hydraulics and having a layer of wire reinforcer 22 therein that is electrically conductive. The hose 21 includes fluid-conveying passageway-defining inner hose material 23 forming an inner leak-proof tube inside of the wire reinforcer 22 for communicating leak-free hydraulic fluid along the hose 21 inside of the wire reinforcer 22 and external/outer hose material 24 forming an outer tube. Notably, a pre-certified reinforced hose 21 can be used for the present apparatus 20, thus greatly reducing cost, capital investment, work-in-process inventory investment, hose certification costs and associated delays, and yet the present hose apparatus 20 is well-constructed for durability, robustness and low-cost assembly.

The present hose apparatus 20 includes a hydraulic hose 21 with wire reinforcer 22 and inner hose material 23 and outer hose material 24, as noted above. An end section (see location 26, FIG. 8) of the outer hose material 24 is cut away (called "skiving") to expose ends 27 of the wire reinforcer 22. A hose end stem 28 engages the passageway-defining material 23 but not the wire reinforcer 22, such that the hose end stem 28 is insulated from an electrical circuit formed by conductive wire 34 and the wire reinforcer 22. A conductive ferrule jacket/sleeve 29 is clamped/crimped onto the exposed ends of the wire reinforcer 22, and an exposed portion of the conductive wire 34 is positioned under the sleeve 29 and/or attached to it (e.g., soldering) in a manner providing good electrical contact. The ferrule sleeve 29 compresses the inner hose material 23 against an undulation in the outer surface of the hose end stem 28, thus holding the end stem 28 on the hose 21 even when the hose stretches from repeated hydraulic pressure and from high hydraulic pressure.

A metal washer 30 is positioned on a hose-side portion of the stem 28 and against a hose-side end of the ferrule sleeve 29. A first insulating washer 31 is positioned adjacent and on a hose-side of the metal washer 30. A second insulating washer 32 is positioned adjacent and on a hose-remote side of the ferrule sleeve 29. An insulated wire 33 includes an insulating sleeve 39 extending from the insulating washer 32 to a contact element 34', and a conductive wire 34 element in electrical contact with the exposed ends 27 (FIG. 1) of wire reinforcer 22. The insulated wire 33 extends in a hose-remote direction from the ferrule sleeve 29 and through a notch or slot in the second insulating washer 32 and through a notch or enlargement in the retainer washer 38. A free end of the exposed conductive wire 34 extends outside and past the hose end stem 28 and coupling nut 35 and includes the electrical contact element 34' for connection to an electrical circuit providing electrical power through the hose 21. A rotatable coupling nut 35 is operably preassembled/connected to the hose-remote end of the stem 28 for threadably connecting the stem 28 in a leak-free manner to a hard threaded hydraulic connector for leak-free connection to the high pressure hydraulic circuit. A stem retainer nut 36 on the hose 21 engages a hose-side surface of the first insulating washer 31. An outer sleeve/jacket 37 covers and protects the ferrule sleeve 29.

It is contemplated that the present arrangement can be reconfigured so that the stem retainer nut 36 and outer sleeve/jacket 37 are reversed, with the retainer nut 36 being re-positioned at a hose-remote end of the stem, such as by providing a C-washer with a machined depression or other component that the stem hex shape locks into.

Figure 3:
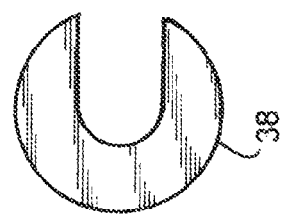

The outer sleeve 37 (FIG. 4A) includes an inward annular flange at its hose-remote end that defines a hex shaped aperture for engaging a hex shaped portion of stem 28. The hex shaped aperture includes an enlarged side to facilitate routing the wire 33 past the ferrule sleeve 37. A slip-on U-shaped retainer washer 38 (FIGS. 1 and 3) is shaped to laterally engage a mating ring-shaped recess of the hose-remote side of the stem 28. The stem retainer nut 36 threadably engages the hose adjacent end of the outer jacket 37. The outer jacket 37 slides over the retainer washer 38 during assembly to positively hold the washer 38 in position. By this arrangement, the wire reinforcer 22 and ferrule sleeve 29 and insulated conductive wire 34 form part of an electrical circuit for conducting electricity from a first location (such as the cab of a fork truck) along the hose 20 to a second location (such as to a powered accessory on a fork truck carriage), but with the stem 28 and coupling nut 35 being insulated from the electrical circuit. Preferably, the ferrule sleeve 29 has grooves on its inner surface for biting engagement with the hose reinforcer 22 and hose inner material 23 to help prevent undesirable pull out and separation of the hose 21.

Many variations are contemplated to be within the present concept. For example, the conductive wire 34 element can be soldered onto the conductive ferrule sleeve 29, or it can be clamped onto the sleeve 29 using a crimped-on outer sleeve made of conductive material, or it can be bonded such as by using conductive epoxy. The wire 34 can be soldered to an inside surface of the sleeve 29 (instead of to the outer surface).

Still different configurations are also contemplated. For example, the rotatable nut 35 can be eliminated, in which case the mating part(s) and/or hose must be rotated to provide threaded engagement. The electrical connection to the wire 34 could then be made after the hose attachment.

Advantageously, the present arrangement allows use of an existing (already-approved) high pressure hydraulic hose with wire reinforcer (such as commercially-made common pressure hoses like SAE100R17 hose). This greatly reduces the time and expense of gaining certification and approval from governing compliance bodies, and reduces the need to set up a special line of equipment to manufacture this hose. It also reduces the need for work-in-process and finished product inventories, and associated costs. This is a tremendous cost advantage for several reasons, including those discussed above in the background.

Advantageously, the present arrangement "electrifies" an existing pressure hose, allowing accessories needing power to be swapped easily and quickly between different fork trucks. This reduces down time, greatly increases flexibility of use by the customer, and yet minimizes cost and downtime of using an "accessory", since power is "instantly" available at the carriage of the fork truck when an electrified hose of the present invention is on the fork truck. For example, this electrical power can be used to power accessories often placed on carriages of fork truck lifts, such as bar code readers, cameras for aiming forks, lights, sensors, and actuators for particular movements on the carriage bed. At the same time, the present arrangement is very durable, robust, and results in low warranty and installation problems, since the conductive wire reinforcer 22 is embedded in the hose materials 23/24, where the conductive wire reinforcer is unlikely to be abused and/or broken during operation of a fork truck. It is noted that fork trucks can encounter substantial abuse during operation, including constant flexing of the hydraulic hose as the fork truck carriage is raised and lowered, and due to constant physical abuse due to collisions, impacts, and abrasions that occur during typical operation of a fork truck.

It is contemplated that persons skilled in this art will understand from the present disclosure that variations can be made and still be within a scope of the present invention. For example, the illustrated ferrule sleeve 29 is a metal tube inwardly deformed to make electrical contact with the wire reinforcer 22, and the outer jacket 37 is metal and spaced from the sleeve 29 by insulating washers 31 and 32 so that an air gap exists and there is no electrical contact between the sleeve 29 and the jacket 37. It is contemplated that the air gap illustrated in FIG. 1 can be filled with an insulating material, such as a tape or non-conductive sleeve. However, it is contemplated that other arrangements can be constructed, as described below. For example, the unitary jacket 37 (see FIGS. 1, 4A and 8) or sleeve 29 (see FIG. 1) can be formed by a clamshell component with halves held together by a retaining ring, as discussed below. Also, the hose apparatus can be held longitudinally together in different ways, such as by a resilient snap-on inner ring retainer, and also as discussed below.

One exemplary method of assembly progression for the electrically conductive hydraulic hose apparatus of FIG. 1 is illustrated in FIGS. 8-15. Specifically FIG. 8 shows the hose 21 with outer hose material 24 removed (skived) to expose wire reinforcer 22 on the exposed inner hose material 23, and the insulated wire 33 with conductive wire element 34 which is a wire braid, braiding not shown, for assembly. As illustrated in FIG. 8, an insulator holder ring/washer 33' is provided on the wire 33 that helps hold the wire conductive wire element 34 during initial assembly, the ring 33' including a washer configured to abut an end of the hose 21 and a male protruding portion (such as tabs) to hold the wire 33 radially in an axially-centered position on the end of the hose 21. FIG. 9 shows the wire holder ring 33' actually engaging the hose 21, with the conductive wire element 34 adjacent the exposed strands of the wire reinforcer 22, and with the stem 28 is positioned for extending into the hose 21. FIG. 10 illustrates the stem 28 engaging the hose 21 with the ferrule sleeve 29 ready to slide into position on an end of the hose 21. FIG. 11 shows the ferrule sleeve 29 positioned on the hose 21. FIG. 12 shows the ferrule sleeve 29 crimped onto the end of the hose 21, the sleeve 29 holding the conductive wire element 34 being in close electrical contact with the exposed strands of the hose wire reinforcer 22. FIG. 12 also shows the washers 30 and 31 and the retainer nut 36 positioned for assembly. FIG. 13 illustrated the washers 30 and 31 and retainer nut 36 slid into position on the end of the hose 21, and the outer jacket 37 in position for assembly. FIG. 14 shows the outer jacket 37 positioned on the assembly. FIG. 15 illustrated the completed assembly of the electrically conductive hydraulic hose apparatus 20.

FIGS. 16-17, FIGS. 18-19, and FIGS. 20-24 disclose modified versions of the hose apparatus 20. In the FIGS. 16-24, similar or identical components are identified with the same number, but with the addition of the letter "A", "B" or "C". This is done to reduce redundant discussion.

Figure 16:
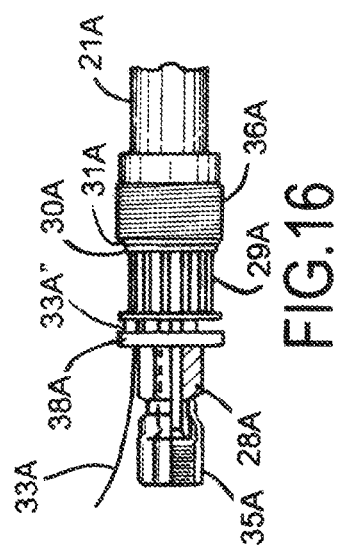
Figure 17:
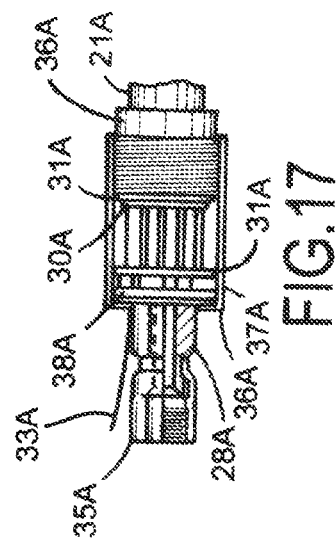
Figure 17A:
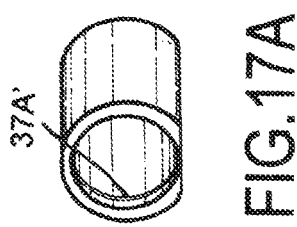
Figure 17B:
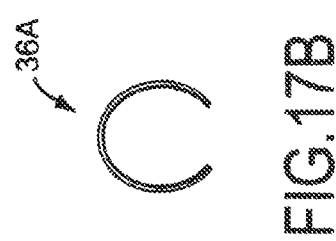

FIGS. 16-17 show a first modified apparatus 20A are similar to FIGS. 14-15, but the holder 33A includes an enlarged protrusion 33A" that both holds the conductive wire 34A and also acts as a lock to engage a mating notch in the retainer 38A to prevent the retainer 38A from rotating. Further, the outer ferrule jacket 37A includes an inner annular groove 37A' at its hose-adjacent end for receiving a resilient snap-in retaining ring 36A to hold the assembly longitudinally together. Thus, the outer ferrule jacket 37A does not need to have an inwardly-extending flange defining a hex shape (which the outer ferrule jacket 37 preferably has to hold its assembly together). (Compare FIG. 17B with FIG. 4A.) The retaining ring 36A snaps into its companion groove 37A', and once assembled, shoulders against the retainer 38A holding it into place as the retainer nut 36A is tightened. Notably, the apparatus 20A includes assembly steps like those shown in FIGS. 8-13, and then FIGS. 16-17 replace the final steps shown in FIGS. 14-15.

FIGS. 18-19 show a second modified apparatus 20B and are similar to FIGS. 14-15, but the outer ferrule sleeve 37B is split into opposing halves that matingly engage in a two-piece clam-shell manner. They are held together by a resilient snap-on outer ring 36B that engages an outer annular groove. (See FIGS. 19A and 19B.) Notably, the apparatus 20B includes assembly steps like those shown in FIGS. 8-13, and then FIGS. 18-19 replace the final steps shown in FIGS. 14-15. It is contemplated that the sleeve 37B can be split transversely instead of longitudinally, and that the longitudinal halves could be held together such as by lacing, Aramid fiber, non-conductive sleeve with longitudinal strength etc. The entire assembly could be covered with a heat shrink covering or other insulative covering.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An electrically conductive hose apparatus comprising:

a hose having a wire reinforcer therein that is electrically conductive and having fluid-conveying passageway-defining hose material inside of the wire reinforcer for communicating leak-free hydraulic fluid along the hose inside of the wire reinforcer and external hose material; an end portion of the external hose material being removed to expose the wire reinforcer;

a hose end stem engaging the passageway-defining material and not the wire reinforcer;

a longitudinally elongated conductive ferrule sleeve having an irregular radially inner surface clamped onto the exposed ends of the wire reinforcer and radially overlapping the hose end stem;

a flat planar metal washer on a hose-side portion of the stem and in direct contact with a hose-side end of the ferrule sleeve;

a first electrically insulating washer adjacent and on a hose-side of the metal washer;

a second electrically insulating washer adjacent and on a hose-remote side of the ferrule sleeve;

an insulated wire including a conductive wire element in electrical contact with the exposed ends of the wire reinforcer, and extending in a hose-remote direction from the ferrule sleeve and past the second insulating washer and terminating in a free end at an electrical connector for connection to a controller or an appliance for conducting electricity through the electrically conductive hose apparatus, the conductive wire element extending from the hose end stem, the insulated wire including an electrically insulating sleeve electrically insulating the conductive wire element from at least the hose end stem;

a rotatable coupling nut rotatably connected to the hose-remote end of the stem for connecting the stem in a leak-free manner to a hard threaded hydraulic connector for leak-free connection to the hydraulic connector and that is also electrically insulated from the conductive wire element by the insulating sleeve;

a stem retainer nut on the hose and proximate the hose-side portion of the stem;

a ferrule sleeve jacket covering and protecting the ferrule sleeve; and a slip-on U-shaped retainer washer shaped to laterally engage a mating ring-shaped recess on the hose-remote side of the stem; the conductive wire element in combination with the wire reinforcer and the conductive ferrule sleeve and in combination with the insulating sleeve defines an insulated circuit into and along the hose that is electrically insulated from the coupling nut of the hose apparatus.

2. An electrically conductive hose apparatus comprising:

a hose having a wire reinforcer therein that is electrically conductive and having fluid-conveying passageway-defining hose material inside of the wire reinforcer for communicating leak-free hydraulic fluid along the hose inside of the wire reinforcer and having external hose material enclosing the wire reinforcer and passageway-defining hose material; an end portion of the external hose material being removed to expose the wire reinforcer;

a hose end stem engaging the passageway-defining material and not the wire reinforcer; the hose end stem including having an undulated inner surface engaging the passageway-defining hose material and having an annular recess in an outboard end;

a rotatable coupling nut with a mating annular flange engaging the annular recess and rotatably connected to the hose-remote end of the hose end stem for connecting the stem in a leak-free manner to a hard threaded hydraulic connector;

a longitudinally extending conductive ferrule sleeve having an irregular radially inner surface clamped onto the exposed ends of the wire reinforcer and overlapping the hose end stem in a longitudinal direction; the ferrule sleeve including an irregular surface engaging the exposed ends and being made of conductive metal but being insulated from the hose end stem by the passageway-defining hose material;

a flat planar metal washer on a hose-side portion of the stem and in direct contact with a hose-side end of the ferrule sleeve;

a first electrically insulating washer adjacent and on a hose-side of the metal washer;

a second electrically insulating washer adjacent and on a hose-remote side of the ferrule sleeve;

an insulated wire including a conductive wire element with a first end connected in electrical contact with the ferrule sleeve and extending in a hose-remote direction from the ferrule sleeve and extending past the hose end stem and terminating in a free end at an electrical connector for connection to a controller or an appliance for conducting electricity through the electrically conductive hose apparatus, the conductor wire element located outboard of and away from the coupling nut; the insulated wire further including an electrically insulating sleeve that extends along the conductive wire element electrically insulating the conductive wire element from at least the hose end stem and the rotatable coupling nut;

a stem retainer nut on the hose and proximate the hose-side portion of the stem;

a ferrule sleeve jacket covering and protecting the ferrule sleeve and the first and second insulating washers; and a slip-on U-shaped retainer washer shaped to laterally engage a mating ring-shaped recess on the hose-remote side of the stem;

the conductive wire element in combination with the wire reinforce and the conductive ferrule sleeve and in combination with the insulating sleeve defines an insulated circuit into and along the hose that is electrically insulated from the coupling nut of the hose apparatus.

* * * * *